Dec. 8, 1942.  H. J. NICHOLS  2,304,770
RANGING DEVICE
Filed Aug. 27, 1941  2 Sheets-Sheet 1

INVENTOR.
Harry J. Nichols
BY
ATTORNEY.

Dec. 8, 1942.    H. J. NICHOLS    2,304,770
RANGING DEVICE
Filed Aug. 27, 1941    2 Sheets-Sheet 2
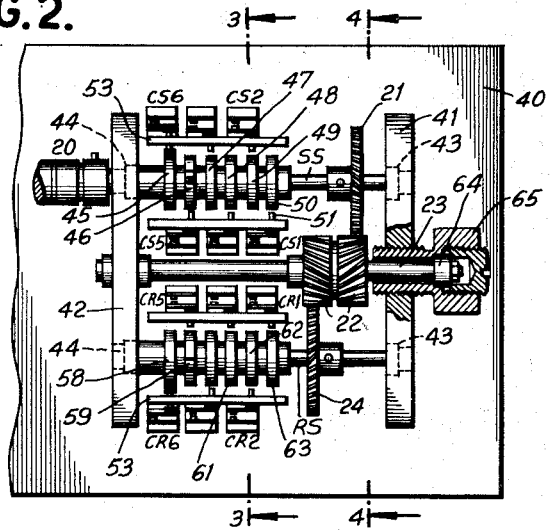
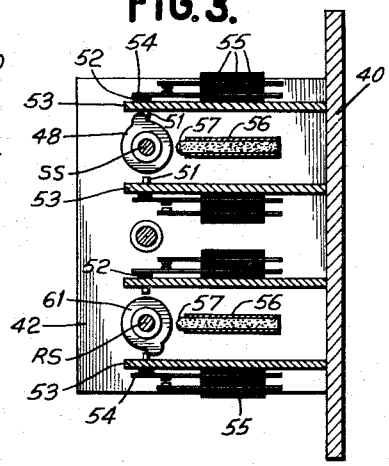
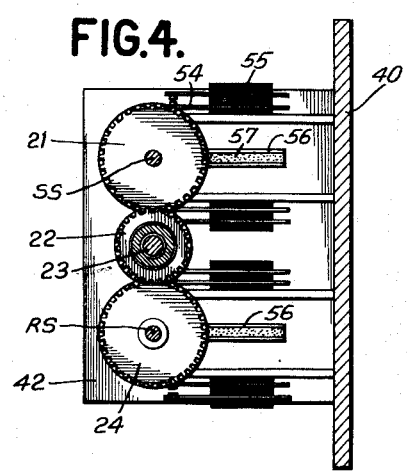
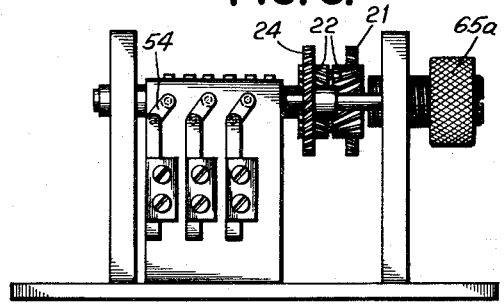
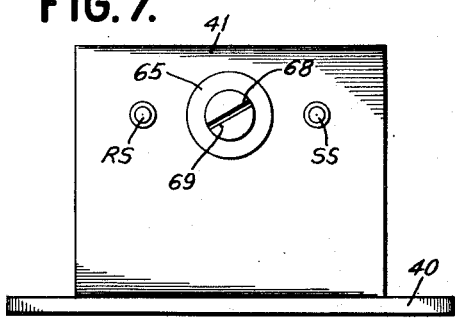
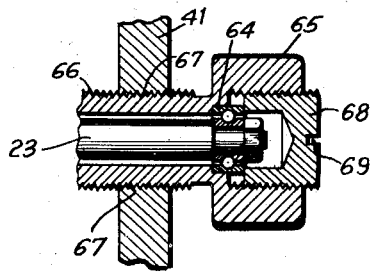
INVENTOR.
Harry J. Nichols
BY
ATTORNEY.

Patented Dec. 8, 1942

2,304,770

UNITED STATES PATENT OFFICE 2,304,770

RANGING DEVICE

Harry J. Nichols, Point Pleasant, N. J., assignor to International Business Machines Corporation, New York, N. Y., a corporation of New York Application August 27, 1941, Serial No. 408,506

9 Claims. (Cl. 178—53.1)

The present invention relates to telegraphy and more particularly to ranging devices employed in telegraphy whereby contacting elements are adjusted to engage during the mid-portions only, of the selecting impulses or intervals of received telegraph signals.

The device of the present invention is adapted for use with a start-stop telegraph system wherein signals comprise permutations of impulses corresponding to two different line conditions existing for each respectively of a definite number of time intervals. The selecting intervals or impulses of each signal are preceded by a starting impulse or interval, of uniform line condition, and followed by a stopping or rest impulse or interval which is always the same and of opposite line condition from that of the starting pulse.

As is customary in telegraph practice, the two different line conditions are also distinguished by referring to them as intervals during which marking or spacing impulses are transmitted. The marking impulses correspond to intervals during which current is transmitted and the spacing impulses correspond to intervals during which no current is transmitted. In the preferred embodiment of the invention, the transmitting mechanism is adapted to transmit a spacing impulse for the start impulse and a marking impulse for the rest or stop impulse.

During the operation of the printers by line signals arriving at a receiver, the signals received may vary considerably from those transmitted. Such variations are termed signal distortion and may affect the shape, amplitude, phase and timing of the signals. There are also mechanical lags due to relay and magnet operations, so that, in general, the signals received, at the receiver, lag in time relation with respect to those at the transmitter. To compensate for such effects, at least in part, a device known as a ranging device is provided, by means of which the timing of the receiver sequences are shifted with respect to those at the transmitter. One of the objects of the present invention, therefore, is to provide a novel ranging mechanism for producing such a shift.

Another object is to provide a novel ranging device whereby the shift in time relations can be produced, either while the machines are stopped or while in operation, thus facilitating and expediting necessary adjustments to secure optimum operation.

Still another object is to provide novel ranging mechanism which is adjustable to a high degree of precision.

Another object is to provide a novel ranging device whereby a cam type distributor can be adjusted to close contacts at the precise center of a received signal impulse.

A further object is to provide a novel distributor including ranging means whereby an axial movement is transformed into a precise movement of rotation to adjust the phase of a rotating member of the distributor.

Another object is to provide novel ranging mechanism comprising a rotatable adjustable member, whose rotation is transformed to an axial movement, and means for transforming said axial movement into a precise rotative adjustment.

Another object is to provide a novel distributor including ranging mechanism whereby a rotative adjustment may be superimposed upon the normal rotation of a distributor element to produce a desired phase shift of said element.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view, with parts omitted, illustrating the mechanism comprising the distributor and novel ranging mechanism.

Fig. 3 is a sectional view, taken on line 3—3 of Fig. 2.

Fig. 4 is a sectional view, taken on line 4—4 of Fig. 2.

Fig. 5 is a side view of the device of Fig. 1.

Fig. 6 is a fragmentary view, illustrating in detail part of the ranging mechanism.

Fig. 7 is an end view of the device of Fig. 2.

Figure 1:
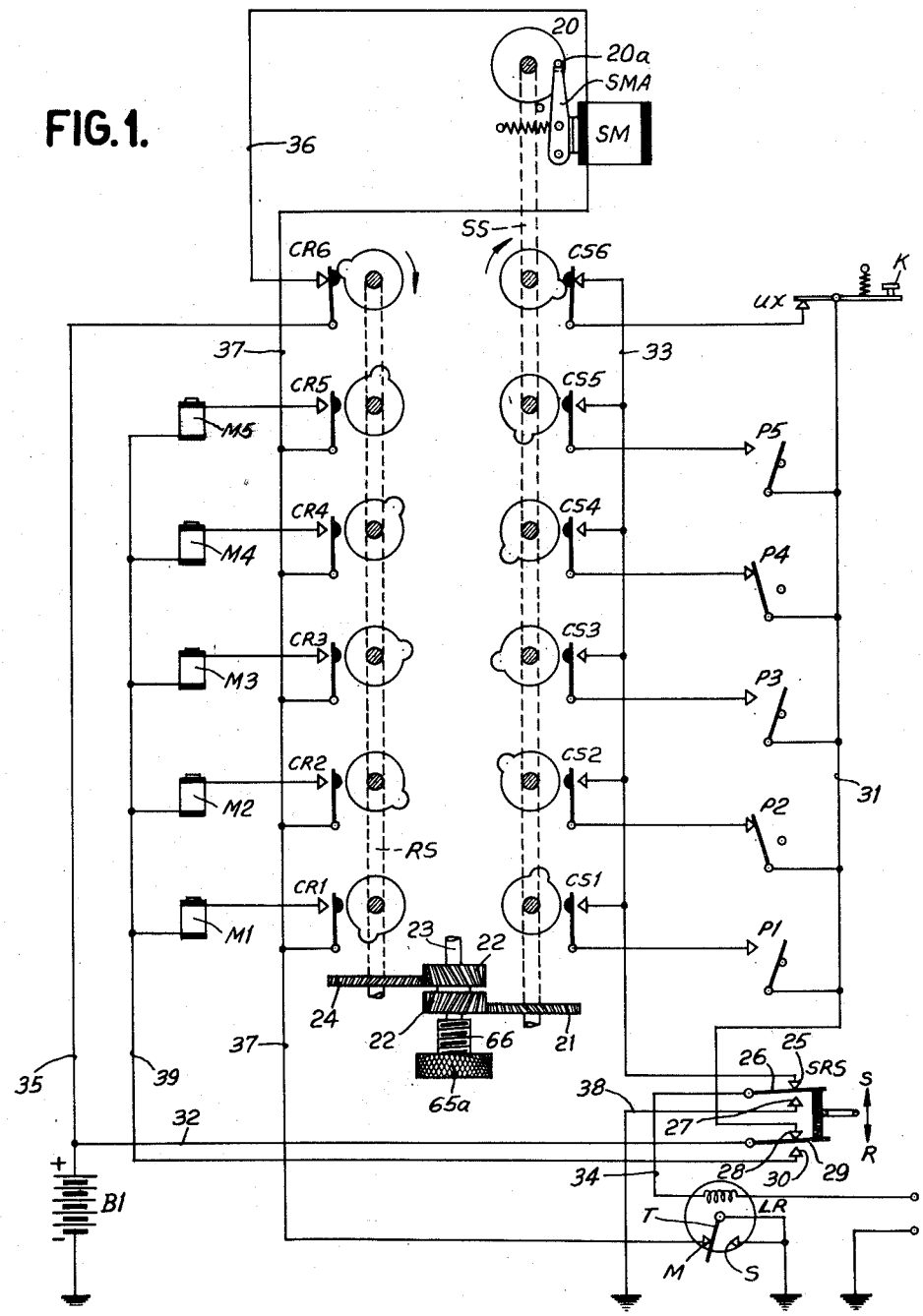
Fig. 1 is a schematic view illustrating the essential elements of a send-receive distributor system including a novel ranging mechanism.

Referring to the drawings and more particularly to Fig. 1, there is illustrated, in schematic manner, a distributor and the application of the novel ranging mechanism to a start-stop, send-receive teleprinter system, including said distributor, and the relation of the distributor to the associated electrical circuits.

A plurality of pairs of cam spring contactors comprise respectively the cam switches CS1 to CS6, inclusive. These spring contacts are controlled by their respective cams mounted on the send shaft SS mounted for rotation by single revolution mechanism 20 controlled by the send magnet SM. The armature SMA of magnet SM is spring-biased to open position and in its attracted position, as shown, abuts a pin 20a of the single revolution mechanism to hold the send shaft SS in stopped position. Upon deenergization of magnet SM, as described later, the armature SMA is released, as well as the pin 20a, so that the single revolution mechanism 20 permits one full revolution of shaft SS, while prior to the completion of such a complete revolution the magnet SM is again energized so that armature SMA is attracted to abut pin 20a and limit the rotation of shaft SS to one complete revolution, all as described later.

Upon rotation of shaft SS, the respective cams close, in sequence, the contacts of cam switches CS1 to CS6, inclusive. Send shaft SS is connected to the receive shaft RS, by the novel ranging mechanism, to be described in detail later, which includes a drive gear 21, connected to shaft SS, the twin herring-bone pinions 22, 22 mounted on and for rotation with shaft 23 and the driven gear 24 connected to the receive shaft RS. Upon rotation of send shaft SS, receive shaft RS is rotated, so that the receive cams mounted thereon operate, in sequence, the receive cam switches CR1 to CR6, inclusive, in the same manner as the send switches are operated. Receive cam switches CR1 to CR5, inclusive, control the energization of the translator magnets M1 to M5, inclusive, which are energized in permutations, selectively, in accordance with signal impulses received. The magnets M1 to M5, inclusive, control well known storage and translating mechanism (not shown) whereby the received signal may be translated into corresponding printing functions.

A send-receive switch SRS controls a plurality of contacts 25—30, inclusive, whereby, in one position of the send-receive switch SRS, the circuits are adjusted to permit transmission of signals, while in the opposite position of switch SRS, received signals are utilized, under control of the receive cam switches, to start the distributor and to selectively control the translator magnets M1 to M5, inclusive, in accordance with the particular signals received.

Bus bar 31 is connected to one side of each of the permutation contacts P1 ot P5, inclusive, which are closed in different permutations, in accordance with the particular key K, of a complete keyboard, which is depressed. Upon operation of any key, such as K, the universal bail switch UX is opened and the switches P1 to P5, inclusive, are selectively set, in a well known manner, in permutations corresponding to the identity of the key depressed.

The send-receive circuit, as illustrated in Fig. 1, provides means for setting up and transmitting code group signals comprising respectively, a start signal, 5-unit code signals, and a stop signal, and also provide means for applying similar received signals to the translator magnets M1 to M5, inclusive, for printing purposes. As is common practice, a closed circuit, working condition is employed, in which the line is normally closed, during intervals between code group transmission, line current being supplied from the sending machine. A line relay LR provided with marking and spacing contacts M and S, respectively, is provided to produce local operating impulses.

During transmission, the manually operated key K, indicative of any key of the manual keyboard of the teleprinter, is depressed, to thereupon open switch UX and to close a certain permutation of the switches P1 to P5, inclusive, indicative of the character or function represented by the depressed key. As illustrated in Fig. 1, permutative contacts are conventionally represented, as being alternately opened and closed. The send shaft SS is normally at rest. With the key K, as shown, (prior to depression thereof) during transmission the following circuit is completed: from battery B1, line 32, contacts 29 and 28 of switch SRS, in the send position, bus bar 31, switch K, universal bail switch UX, cam switch CS6, bus bar 33, contacts 25 and 26, line 34, the coil of line relay of LR to the line, and to ground via the remote machine.

Upon energization of line relay LR, its tongue T is placed in engagement with the marking contact M, as shown, and the following circuit is closed: from battery B1, line 35, cam switch CR6 (now closed), line 36, start magnet SM, bus 37, marking contact M, tongue T, to ground. Energization of start magnet SM holds the armature SMA in engagement with pin 20a of the single revolution clutch 20 thereby holding the start shaft SS in stopped position.

Upon depression of key K, the universal bail switch UX is opened, line current is broken, the coil of line relay LR is deenergized and the tongue T engages the spacing contact S so that the circuit through the start magnet SM is broken and the start signal is transmitted over the line.

Upon deenergization of magnet SM, single revolution clutch mechanism 20 is released and shaft SS starts into rotation. The cams controlling the spring contacts of cam switches CS1 to CS6 are rotated by shaft SS so that alternate spacing and marking impulses are transmitted over the line by cam switches CS1 to CS5, inclusive, cooperating with the permutation switches P1 to P5, inclusive, in the position, as illustrated. Cam switch CS6 closes immediately after cam switch CS5, and assuming that switch UX has been meanwhile closed, the line circuit is closed by way of UX and CS6 thereby sending the invariable "current-on" or marking, stop signal to the line. Simultaneously, the line relay LR is energized and tongue T engages the marking contact M to close the circuit through the start magnet SM, whereupon the armature SMA is attracted, to engage pin 20a, to stop the single revolution clutch 20, after one complete revolution thereof, thus terminating one complete sending cycle.

During reception, switch SRS is thrown to the R or receive position. The sending circuits are thereby isolated and the effects of the line signals are restricted to the receiving apparatus. Assuming, as before, that the line current is supplied from the (now remote) sending machine, the coil of line relay LR is energized by way of the following circuit: from the line, coil of LR, line 34, contacts 26 and 27, line 38 to ground. Upon energization of the coil of line relay LR, the tongue T is held in engagement with the marking contact M and the following circuit is closed: Battery B1, line 35, cam switch CR6, line 36, start magnet SM, bus 37, marking contact M, tongue T to ground, and the shaft SS is held in stopped position by the start magnet SM.

Upon reception of the start signal, which, as assumed above, is a spacing signal, the tongue T of line relay LR transfers to the spacing contact S, breaking the circuit to SM. The armature SMA is released, as well as pin 20a, and the single revolution clutch mechanism 20 begins its rotation of shaft SS. As shaft SS is rotated, the receive shaft is also rotated by means of the ranging mechanism gear train, described above. Rotation of the receive shaft RS, sequentially closes the cam switches CR1 to CR6, inclusive, whereby the magnets M1 to M5, inclusive, are selectively energized, in accordance with the received signal impulses by means of the following circuit: from battery B1, line 32, contacts 29 and 30, bus bar 39 to the respective magnets M1 to M5, inclusive, the respective switches CR1 to CR5, inclusive, bus 37, and to ground via marking contact M of line relay LR, provided that a marking signal is received, as the respective switches CR1 to CR5 are closed. This respective energization of magnets M1 to M5, inclusive, is in each instance, therefore, dependent upon whether or not contact M of line relay LR is engaged by the tongue T at the instant the associated sequence cam switch is closed. Well known auxiliary signal storage and translator mechanism (not shown) is effective to translate the signals into the selection of the corresponding printing function of a receiving teleprinter, corresponding to the transmitting function at the sending teleprinter. Subsequent, sequentially, to closing of cam switch CR5, cam switch CR6 is closed, reenergizing send magnet SM to attract its armature SMA to engage pin 20a, so that shaft SS is stopped, after one complete cycle of rotation thereof.

Referring to Figs. 2 to 7, inclusive, there is illustrated, in greater detail, the novel ranging mechanism, illustrated generally only, in Fig. 1. A base 40 comprises the support for a pair of vertical end plates 41, 42 which support the distributor mechanism. Send shaft SS is mounted in bearings 43, 44 in the end plates 41 and 42, respectively, and is adapted to be rotated by the single revolution clutch mechanism 20, which in turn is driven by any desired means. Mounted on shaft SS are the transmitting cams 45 to 50, inclusive, cooperating, respectively, with steel push pins 51 provided with insulated ends 52 and slidably mounted in vertical side plates 53 disposed, respectively, on opposite sides of the cams. The insulated ends 52 of pins 51 engage the tongue springs 54, respectively, of the contact springs which comprise the cam switches, these springs being mounted in pairs between insulator washers 55 on the vertical plates 53. Each tongue spring is slightly extended (Fig. 5) and curved outwardly, to combine torsional as well as bending stress in the tongue whereby the spring action is steadied when the tongue is released, thereby preventing bouncing. As cams 45 to 50, inclusive, rotate, push pins 51 are urged outwardly, against the spring action of the tongues 54 acting against the insulated ends 52, and the tongue springs are respectively sequentially urged into engagement with corresponding spring contacts, to close the cam switches CS1 to CS6, inclusive. A vertical oiling well 56 provided with a felt wick 57 is located beneath the cam shaft, the top edge of the wick touching the rise portion of all of the cams, thereby providing constant oiling and cleaning of the respective cam surfaces.

The receive shaft RS is similarly mounted in bearings 43 and 44 in plates 41 and 42, respectively, and is provided with cams 58 to 63, inclusive, similar to the send cams 45 to 50 of shaft SS. Suitable spring contact assemblies and oiling devices, similar to those of the sending unit, cooperate with the shaft RS and cams 58 to 63, inclusive, comprising the receiving unit.

Novel ranging mechanism, as illustrated in Figs. 4, 5, 6 and 7, is provided, interconnecting the shafts SS and RS whereby the receive shaft is rotated by the send shaft and whereby the relative phase of the shafts may be adjusted. Drive gear 21 is mounted on and connected to shaft SS, as described above, and engages with one of a pair of herring-bone pinions 22, 22 mounted on and connected to shaft 23. One of the pinions 22 engages with gear 24 mounted on and connected to shaft RS. The gears and pinions are provided with spiral teeth, cut at an angle of 45 degrees to the axis. The teeth of the respective pinions 22 incline in opposite directions (Fig. 2) thus compensating for end thrust reactions among the several gears.

Shaft 23 is mounted for axial movement and is supported at one end in a bearing (not shown) in plate 42 and at the other end in ball bearing 64 mounted in a threaded ball bearing container 65. Container 65 is provided with a threaded extension 66 engaging a cooperating thread 67 in plate 41. A threaded plug member 68 provided with a slot 69 closes the interiorly bored portion of container 65. Upon rotation of container 65 by means of the knurled head 65a (Fig. 5) the ball bearing 64 is shifted axially to thereby axially shift shaft 23. Axial shift of shaft 23 similarly shifts the herring-bone pinions 22, 22 whereby gear 24 is rotated slightly due to a slight axial movement of shaft 23 and the phase of the receive shaft RS is thereby adjusted with respect to shaft SS. When shaft SS rotates the shaft RS by means of the gear train included in the ranging mechanism, the rotative adjustment of knob 65a superimposes an additional rotation upon the receive shaft RS whereby its phase is altered, as previously stated. Such shift of phase adjusts the timing of cams 58 to 63, inclusive, so that the cam switches CR1 to CR6, inclusive, are closed, at the exact center of the signal impulse received. Since the send shaft at the receiver runs in synchronism with that of the transmitter, the superimposed angular shift or change of phase of shaft RS produces the required ranging adjustment.

Novel distributor and ranging mechanism are therefore provided whereby a precise ranging adjustment is produced either during actual rotation or upon stoppage of such rotation.

While there has been shown and described and pointed out the fundamental novel features of the invention as applied to one modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A distributor mechanism comprising a shaft, a plurailty of distributor elements mounted on said shaft for rotation thereby, a plurality of sets of contacts, one set for each element, for operation, respectively, by said element, upon rotation of said element, and means for initially adjusting the relative rotative position of said elements with respect to said respective sets of contacts, comprising means for rotating said shaft, and means, axially movable, for producing an initial rotative adjustment of said rotating means.

2. In combination, a distributor mechanism comprising a shaft, a plurality of cams mounted on said shaft for rotation thereby, a plurality of sets of contacts, one set for each cam and controlled thereby upon rotation of said cams, and a ranging device comprising means for rotating said shaft and means transmitting the effect of said rotating means to said shaft, and including axially movable means superimposing an additional rotative correction upon said shaft.

3. In combination, a distributor mechanism comprising a shaft, a plurality of cams mounted on said shaft for rotation therewith, a plurality of sets of contacts, one set for each cam, mounted in close proximity to its cooperating cam and operative upon rotation thereof, rotation producing start-stop means for controlling the operation of said shaft, means intermediate said start-stop means and said shaft, comprising means for transmitting the rotation of said start-stop means and including axially movable means for superimposing a measured additional rotation upon said shaft.

4. In a start-stop telegraphy system, the combination of a shaft, switch operating means mounted on said shaft for rotation thereby, a switch controlled by said operating means upon said rotation, start-stop rotation producing means for controlling the operation of said shaft, and means intermediate said start-stop means and said shaft, comprising means for transmitting the rotation of said start-stop means upon rotation of said intermediate means and including means for superimposing an additional, corrective rotation upon said shaft, said last named means comprising means for producing an axial movement of said intermediate means.

5. In a device of the character described, a shaft, a switch, means mounted on said shaft and operative to operate said switch in a chosen rotative position of said shaft measured from a chosen base position, and means for adjusting said chosen rotative position with respect to said base, comprising a gear connected to said shaft, a pinion meshing with said gear and means for axially adjusting the position of said pinion to rotatively adjust the position of said gear.

6. In a device of the character described, a shaft, a switch, means mounted on said shaft and operative to operate said switch in a chosen rotative position of said shaft measured from a chosen base position, and rotative and axially movable means for adjusting said chosen rotative position, said last-named means transmitting its rotative movement to said shaft, and means for transforming the axial movement of said means to an additional rotation of said shaft.

7. In a device of the character described, a shaft, a switch, means mounted on said shaft and operative to operate said switch in a chosen rotative position of said shaft measured from a chosen base position, and means for adjusting said chosen rotative position comprising a gear connected to said shaft, a pinion meshing with said gear, means mounting said pinion for axial and rotative motion, means rotating said pinion to produce desired rotation of said shaft and adjustable means for incrementally altering the axial position of said pinion to produce a phase shift of said shaft superimposed upon its normal change in rotative position during rotation thereof.

8. In a device of the character described, a shaft, a switch, means mounted on said shaft and operative to operate said switch in a chosen rotative position of said shaft, rotating start-stop means controlling the rotation of said shaft and including intermeshing gear means for transmitting the rotation of said means to said shaft, and means for altering the axial position of said gear means to produce an additional rotative adjustment of said shaft.

9. A ranging device comprising a pair of shafts, start-stop means controlling the rotation of one of said shafts, means for transmitting the rotation of one of said shafts to the other, said means including a gear mounted on said shaft, a third shaft, a pair of herring-bone pinions mounted on said third shaft, said gear meshing with one of said pinions, a gear mounted on said other shaft and meshing with the other of said pinions, means supporting said third shaft for rotative and axial movement, and means comprising interengaging threaded means, adjustably rotative, for incrementally altering the normal position of said thrid shaft, whereby the axial movement of one of said pinions adjustably rotates the gear of said other shaft to produce a ranging adjustment of said other shaft.

HARRY J. NICHOLS.